(12) United States Patent
Kosslyn et al.

(10) Patent No.: US 9,723,044 B1
(45) Date of Patent: Aug. 1, 2017

(54) STREAM OF CONTENT FOR A CHANNEL

(71) Applicant: Google Inc., Mountain View, CA (US)

(72) Inventors: Justin Lewis Kosslyn, San Francisco, CA (US); Andrew Tomkins, San Jose, CA (US); Andre Rohe, Mountain View, CA (US); Daniel Dulitz, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 14/622,760

(22) Filed: Feb. 13, 2015

Related U.S. Application Data

(63) Continuation of application No. 13/329,278, filed on Dec. 17, 2011, now Pat. No. 8,990,352.

(60) Provisional application No. 61/424,636, filed on Dec. 18, 2010.

(51) Int. Cl.
*H04L 29/06* (2006.01)
*H04L 29/08* (2006.01)

(52) U.S. Cl.
CPC .............. *H04L 65/60* (2013.01); *H04L 67/10* (2013.01)

(58) Field of Classification Search
None
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,003,515 B1 | 2/2006 | Glaser et al. |
| 7,106,848 B1 | 9/2006 | Barlow et al. |
| 7,366,990 B2 | 4/2008 | Pitroda |
| 7,401,025 B1 | 7/2008 | Lokitz |
| 7,555,110 B2 | 6/2009 | Dolan et al. |
| 7,610,287 B1 | 10/2009 | Dean et al. |
| 7,742,468 B2 | 6/2010 | Vagelos |
| 7,761,454 B2 | 7/2010 | Smyth et al. |
| 7,827,110 B1 | 11/2010 | Wieder |
| 7,962,482 B2 | 6/2011 | Handman et al. |

(Continued)

FOREIGN PATENT DOCUMENTS

WO     WO0279984     10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Hassan Phillips
*Assistant Examiner* — Omeed D Rahgozar
(74) *Attorney, Agent, or Firm* — Patent Law Works LLP

(57) ABSTRACT

A system and method for generating a channel includes a channel engine that retrieves candidate content items based on a topic from heterogeneous data sources. The channel engine generates a stream of content with selected content items and populates the stream of content for the channel and providing the stream of content to users associated with the channel. In response to receiving feedback, the channel engine modifies the at least one topic based at least in part on the feedback. The scoring engine generates a second stream of content from the first stream of content that is personalized for the first user based at least in part on a model. Other users can subscribe to the second stream.

27 Claims, 10 Drawing Sheets

(56) References Cited

U.S. PATENT DOCUMENTS

| | | | |
|---|---|---|---|
| 8,055,655 | B1 | 11/2011 | He et al. |
| 8,091,032 | B2 | 1/2012 | Fischer |
| 8,255,812 | B1 | 8/2012 | Parparita et al. |
| 2001/0042060 | A1 | 11/2001 | Rouse et al. |
| 2002/0137490 | A1 | 9/2002 | Gallant |
| 2002/0143874 | A1 | 10/2002 | Marquette et al. |
| 2002/0167539 | A1 | 11/2002 | Brown et al. |
| 2002/0194076 | A1 | 12/2002 | Williams et al. |
| 2003/0061211 | A1 | 3/2003 | Shultz et al. |
| 2004/0258220 | A1 | 12/2004 | Levine et al. |
| 2004/0267740 | A1 | 12/2004 | Liu et al. |
| 2005/0038688 | A1 | 2/2005 | Collins et al. |
| 2005/0152521 | A1 | 7/2005 | Liljestrand |
| 2006/0020616 | A1 | 1/2006 | Hardy et al. |
| 2006/0026288 | A1 | 2/2006 | Acharya et al. |
| 2006/0041530 | A1 | 2/2006 | Milic-Frayling et al. |
| 2006/0074883 | A1 | 4/2006 | Teevan et al. |
| 2006/0077957 | A1 | 4/2006 | Reddy et al. |
| 2006/0136589 | A1 | 6/2006 | Konig et al. |
| 2006/0167857 | A1 | 7/2006 | Kraft et al. |
| 2006/0206604 | A1 | 9/2006 | O'Neil et al. |
| 2006/0212444 | A1 | 9/2006 | Handman et al. |
| 2006/0224509 | A1 | 10/2006 | Walker et al. |
| 2006/0242139 | A1* | 10/2006 | Butterfield et al. ............... 707/5 |
| 2006/0282336 | A1 | 12/2006 | Huang |
| 2007/0016553 | A1 | 1/2007 | Dumais et al. |
| 2007/0043742 | A1 | 2/2007 | Arguello et al. |
| 2007/0060099 | A1 | 3/2007 | Ramer et al. |
| 2007/0109616 | A1 | 5/2007 | Thompson |
| 2007/0127631 | A1 | 6/2007 | Difiglia |
| 2007/0143260 | A1 | 6/2007 | Markov et al. |
| 2007/0162424 | A1 | 7/2007 | Jeh et al. |
| 2007/0171898 | A1 | 7/2007 | Salva |
| 2007/0173236 | A1 | 7/2007 | Vishwanathan et al. |
| 2007/0219754 | A1 | 9/2007 | D'Ambrosio |
| 2007/0242626 | A1 | 10/2007 | Altberg et al. |
| 2007/0244884 | A1 | 10/2007 | Yang |
| 2007/0248077 | A1 | 10/2007 | Mahle, Jr. et al. |
| 2007/0265905 | A1 | 11/2007 | Lazier |
| 2008/0004989 | A1 | 1/2008 | Yi |
| 2008/0026804 | A1 | 1/2008 | Baray et al. |
| 2008/0040474 | A1* | 2/2008 | Zuckerberg et al. ......... 709/224 |
| 2008/0056475 | A1 | 3/2008 | Brannick et al. |
| 2008/0059308 | A1 | 3/2008 | Gerken |
| 2008/0059460 | A1 | 3/2008 | Lunenfeld |
| 2008/0077462 | A1 | 3/2008 | Patel et al. |
| 2008/0147450 | A1 | 6/2008 | Mortimore |
| 2008/0192656 | A1 | 8/2008 | Vagelos |
| 2008/0208841 | A1 | 8/2008 | Zeng et al. |
| 2008/0209320 | A1 | 8/2008 | Mawhinney et al. |
| 2008/0255977 | A1 | 10/2008 | Altberg et al. |
| 2009/0006398 | A1 | 1/2009 | Lam et al. |
| 2009/0113288 | A1 | 4/2009 | Thampy et al. |
| 2009/0125403 | A1 | 5/2009 | Li |
| 2009/0164408 | A1 | 6/2009 | Grigorik et al. |
| 2009/0210321 | A1 | 8/2009 | Rapp |
| 2009/0222481 | A1 | 9/2009 | Fisher et al. |
| 2010/0030717 | A1 | 2/2010 | Agarwal et al. |
| 2010/0042928 | A1 | 2/2010 | Rinearson |
| 2010/0094878 | A1 | 4/2010 | Soroca et al. |
| 2010/0131527 | A1 | 5/2010 | Wohlert |
| 2010/0138423 | A1 | 6/2010 | Moore et al. |
| 2010/0191799 | A1* | 7/2010 | Fiedorowicz et al. ........ 709/203 |
| 2010/0287368 | A1 | 11/2010 | Shuster et al. |
| 2010/0299360 | A1 | 11/2010 | Yi |
| 2011/0041076 | A1 | 2/2011 | Sinn et al. |
| 2011/0098156 | A1 | 4/2011 | Ng et al. |
| 2011/0154183 | A1 | 6/2011 | Burns et al. |
| 2011/0161323 | A1 | 6/2011 | Hagiwara |
| 2011/0161336 | A1 | 6/2011 | Shiga et al. |
| 2011/0167054 | A1 | 7/2011 | Bailey et al. |
| 2011/0178995 | A1 | 7/2011 | Suchter et al. |
| 2011/0196933 | A1 | 8/2011 | Jackson et al. |
| 2011/0218946 | A1 | 9/2011 | Stern et al. |
| 2011/0225170 | A1 | 9/2011 | Obasanjo et al. |
| 2011/0246907 | A1 | 10/2011 | Wang et al. |
| 2012/0054190 | A1 | 3/2012 | Peters |
| 2012/0084291 | A1 | 4/2012 | Chung et al. |
| 2012/0102410 | A1 | 4/2012 | Gewecke et al. |
| 2012/0113121 | A1 | 5/2012 | Luo et al. |
| 2012/0144328 | A1 | 6/2012 | O'Byrne |
| 2012/0158753 | A1* | 6/2012 | He et al. ....................... 707/752 |
| 2013/0204873 | A1* | 8/2013 | Vandermolen .... G06F 17/30867 707/736 |
| 2013/0247212 | A1* | 9/2013 | Muriello et al. ................ 726/26 |
| 2014/0019551 | A1* | 1/2014 | Zuckerberg et al. ......... 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.

(56) References Cited

OTHER PUBLICATIONS

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute Deri Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

Yu et al., "It Takes Variety to Make a World: Diversification in Recommender Systems," 2009, pp. 1-11, downloaded from https://openproceedings.org/2009/conf/edbt/YuLA09.pdf.

Adamic et al., "Search in power-law networks," Physical Review E, 2001, vol. 64, HP Labs/Stanford University, The American Physical Society.

\* cited by examiner

STREAM OF CONTENT FOR A CHANNEL

CROSS REFERENCE TO RELATED APPLICATIONS

This application is a continuation of and claims priority to U.S. application Ser. No. 13/329,278, filed Dec. 17, 2011, titled "Stream of Content for a Channel," which claims priority under 35 U.S.C. §119, of U.S. Provisional Patent Application No. 61/424,636, entitled "Scoring Stream Items with Models Based on User Interests" filed Dec. 18, 2010, each of which is incorporated by reference in its entirety.

BACKGROUND

The specification relates to generating a channel from data sources. In particular, the specification relates to generating a channel for a topic from heterogeneous data sources based on the global scores of the content items, updating the channel by rating the content items in it and personalizing the channel for a user.

Many consumers of digital media have two somewhat contradictory goals: keep apprised of information in the areas they already find interesting and discover new content that is also enjoyable. Keeping apprised of information can become burdensome in the digital age because there is so much information. In addition, news articles may be repetitive. A consumer may become overwhelmed by the information. Similarly, discovering new content may be difficult when the consumer is overburdened with existing content.

SUMMARY

According to one innovative aspect of the subject matter described in this disclosure may be embodied in methods that include generating a channel for distributing content for at least one topic in a social network, retrieving candidate content items from data sources based at least in part on the at least one topic, generating a stream of content with selected content items, populating the stream of content for the channel and providing the stream of content to users associated with the channel, receiving feedback for the selected content items and modifying the at least one topic based at least in part on the feedback. Other aspects can be embodied in corresponding methods and apparatus, including computer program products.

These and other aspects can include one or more of the following features. In some examples, the feedback is an approval or disapproval of at least one of the selected content items. In other implementations, modifying the at least one topic based at least in part on the feedback comprises generating a more specific topic for the channel in response to receiving disapproval of at least one selected content item that is associated with a broader topic. In some implementations, modifying the at least one topic based on the feedback comprises generating a more specific topic for the channel in response to receiving more approval of selected content items associated with a more specific topic than approval of selected content items associated with a broader topic. In some implementations, a suggested content item is received for the channel from a first user with an untrustworthy reputation and publication of the suggested content item is delayed until an authorized user provides permission. In some implementations, an activity of a first user is received that is associated with the channel and a reputation is assigned to the first user based at least in part on the activity.

In general, another innovative aspect of the subject matter described in this disclosure includes a system comprising a processor, a channel generator stored on a memory and executable by the processor, the channel generator generating a channel for distributing content for at least one topic in a social network, a content retriever coupled to the channel generator, the content retriever retrieving candidate content items from data sources based at least in part on the at least one topic and a channel populator stored on the memory and coupled to the channel generator, the channel populator generating a stream of content with selected content items, populating the stream of content for the channel and providing the stream of content to users associated with the channel, wherein the channel generator receives feedback for the selected content items and modifies the at least one topic based at least in part on the feedback. Other aspects can be embodied in corresponding methods and apparatus, including computer program products.

According to one innovative aspect of the subject matter described in this disclosure may be embodied in methods that include generating a channel for distributing content for at least one topic in a social network, retrieving candidate content items from data sources based at least in part on the at least one topic, generating a first stream of content with selected content items, generating a second stream of content from the first stream of content that is personalized for the first user based at least in part on a model and providing the second stream of content to the user. Other aspects can be embodied in corresponding methods and apparatus, including computer program products.

These and other aspects can include one or more of the following features. In some instances, the method also includes generating a personalized stream of content for the first user based on the model, comparing the second stream of content to the personalized stream of content and removing selected content items from the second stream of content that are duplicates of selected content items in the personalized stream of content. In some instances, the second stream of content is provided to a second user that has subscribed to the personalized stream of content. In some instances, obsolete candidate content items are deleted from the first stream of content that are older than a threshold amount of time. In some instances, the candidate content items are retrieved from data sources that are outside of a social network application.

In general, another innovative aspect of the subject matter described in this disclosure includes a system comprising a processor, a channel engine stored on a memory and executable by the processor, the channel engine generating a channel for distributing content for at least one topic in a social network, retrieving candidate content items from data sources based at least in part on the at least one topic and generating a first stream of content with selected content items and a scoring engine stored on the memory and coupled to the channel engine, the scoring engine generating a second stream of content from the first stream of content that is personalized for the first user based at least in part on a model and providing the second stream of content to the user. Other aspects can be embodied in corresponding methods and apparatus, including computer program products.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

A system and method for generating a channel for a topic and retrieving candidate content items from heterogeneous data sources based on the topic and keywords related to the topic is described below.

Figure 1A:
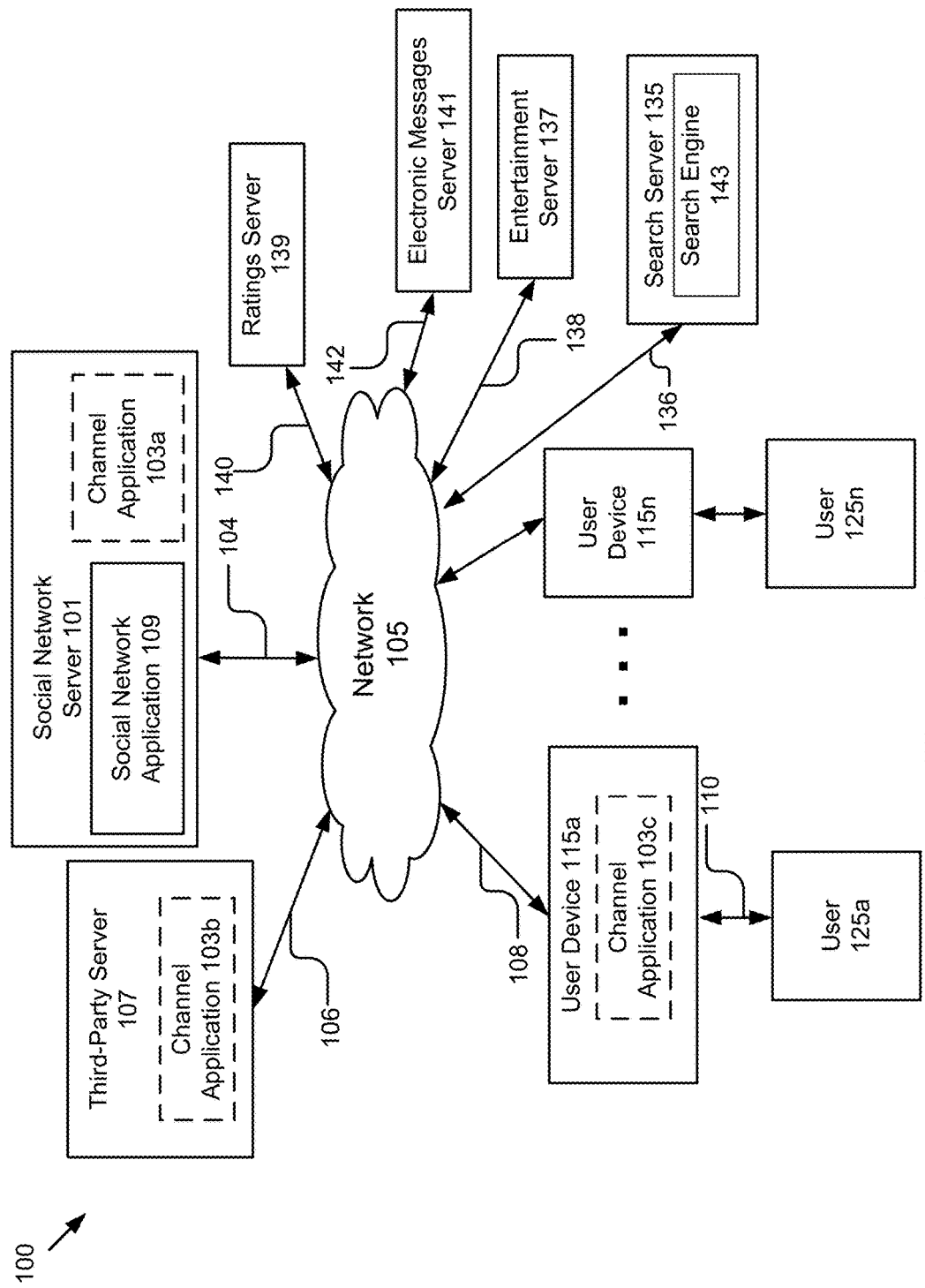
FIG. 1A is a block diagram illustrating an example system for generating channels from data sources.

FIG. 1A illustrates a block diagram of a system 100 for generating channels from data sources according to some implementations. The system 100 for generating channels from data sources includes user devices 115a . . . 115n that are accessed by users 125a . . . 125n, a social network server 101 and a third-party server 107. In the illustrated embodiment, these entities are communicatively coupled via a network 105.

The user devices 115a . . . 115n in FIG. 1A are used by way of example. While FIG. 1A illustrates two devices, the description applies to any system architecture having one or more user devices. Furthermore, while only one network 105 is coupled to the user devices, 115a . . . 115n, the social network server 101 and the third-party server 107, in practice any number of networks 105 can be connected to the entities. Furthermore, while only one third-party server 107 is shown, the system 100 could include one or more third-party servers 107.

In some implementations, the channel application 103a is operable on the social network server 101, which is coupled to the network 105 via signal line 104. The social network server 101 also contains a social network application 109. In some implementations, the channel application 103a is a component of the social network application 109. Although only one social network server 101 is shown, multiple servers may be present. A social network is any type of social structure where the users are connected by a common feature. The common features include friendship, family, work, an interest, etc. The common features are provided by one or more social networking systems, for example those included in the system 100, including explicitly-defined relationships and relationships implied by social connections with other users, where the relationships are defined in a social graph. The social graph is a mapping of all users in a social network and how they are related to each other.

In some implementations, the channel application 103b is stored on a third-party server 107, which is connected to the network 105 via signal line 106. The third-party server 107 includes, for example, an application that generates a website that displays information generated by the channel application 103b. For example, the website includes a section of embeddable code for displaying a stream of content generated by the channel application 103b.

In some implementations, the channel application 103c is stored on a user device 115a, which is connected to the network 105 via signal line 108. The user 125a interacts with the user device 115a via signal line 110. Similarly, the user device 115n is coupled to the network 105 and the user 125n interacts with the user device 115n. The channel application 103 can be stored in any combination on the devices and servers.

The network 105 can be wired or wireless, and may have any number of configurations for example a star configuration, token ring configuration or other configurations. Furthermore, the network 105 may comprise a local area network (LAN), a wide area network (WAN) (e.g., the Internet), and/or any other interconnected data path across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data for example via short messaging service (SMS), multimedia messaging service (MMS), hypertext transfer protocol (HTTP), direct data connection, WAP, electronic messages, etc.

The channel application 103 receives data for generating channels and a stream of content for a user from heterogeneous data sources. In some implementations, the channel application receives data from a third-party server 107, a social network server 101, user devices 115a . . . 115n, a search server 135 that is coupled to the network 105 via signal line 136, an entertainment server 137 that is coupled to the network 105 via signal line 138, a ratings server 139 that is coupled to the network 105 via signal line 140, and an electronic messages server 141 that is coupled to the network 105 via signal line 142. In some implementations, the search server 135 includes a search engine 143 for retrieving results that match search terms from the Internet. The channel application 103 generates a channel for a topic, receives candidate content items from heterogeneous data sources, generates a stream of content for the channel from the candidate content items, and populates the channel with the stream of content for the channel. In some implementations, the channel application 103 personalizes the channel for a user by rescoring the candidate content items for a user and generating a personalized content stream.

Figure 1B:
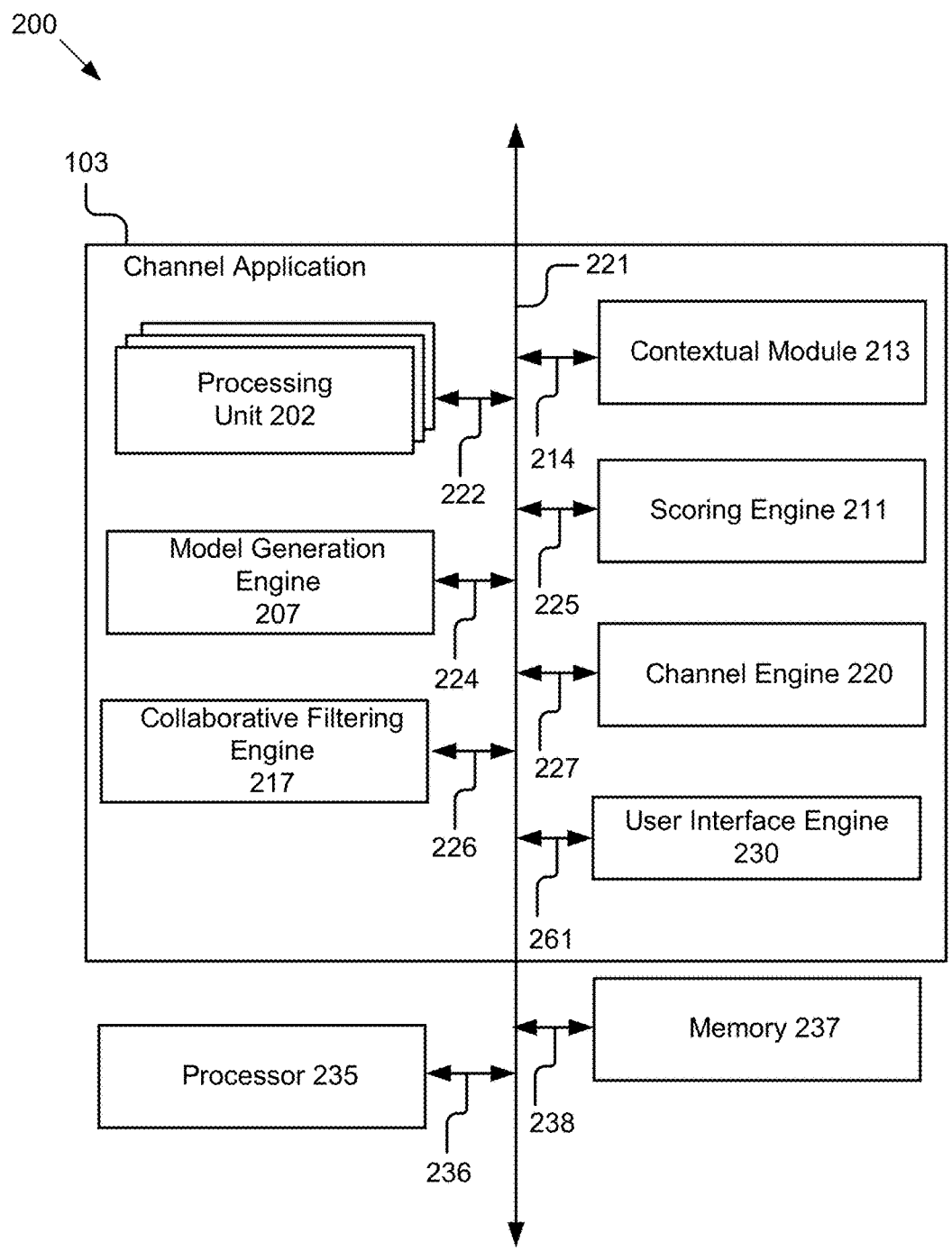
FIG. 1B is a block diagram illustrating an example system for generating channels from data sources.

Referring now to FIG. 1B, the channel application 103 is shown in more detail. FIG. 1B is a block diagram of a computing device 200 that includes the channel application 103, a memory 237 and a processor 235. In some implementations, the computing 200 device is a social network server 101. In some implementations, the computing device 200 is a third-party server 107. In some implementations, the computing device 200 is a user device 115a.

Figure 2:
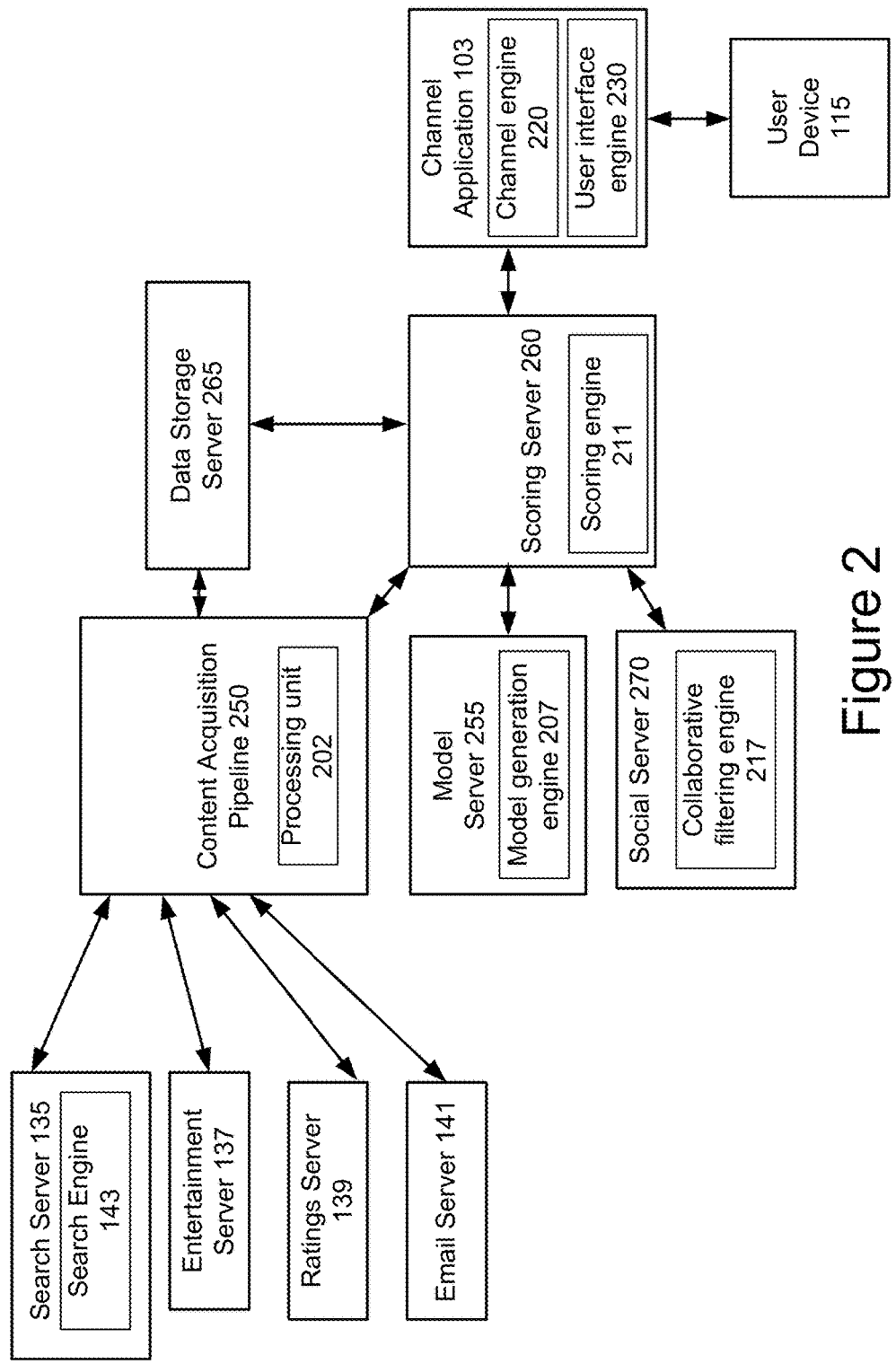
FIG. 2 is a block diagram illustrating an example channel application.

The processor 235 comprises an arithmetic logic unit, a microprocessor, a general purpose controller, or some other processor array to perform computations and provide electronic display signals to a display device. The processor 235 is coupled to the bus 221 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature determination and sampling. Other processors, operating systems, sensors, displays, and physical configurations are possible.

The memory 237 stores instructions and/or data that may be executed by processor 235. The memory 237 is coupled to the bus 221 for communication with the other components via signal line 238. The instructions and/or data may comprise code for performing any and/or all of the techniques described herein. The memory 237 may be a dynamic random access memory (DRAM) device, a static random access memory (SRAM) device, flash memory, or some other memory device known in the art. In some implementations, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the channel application 103 comprises a processing unit 202, a model generation engine 207, a contextual module 213, a scoring engine 211, a channel engine 220, a collaborative filtering engine 217, and a user interface engine 230.

The processing unit 202 is software including routines for receiving information about a user's interests and social connections and for processing the information. In some implementations, the processing unit 202 is a set of instructions executable by the processor 235 to provide the functionality described below for processing the information. In some implementations, the processing unit 202 is stored in the memory 237 of the computing device 200 and is accessible and executable by the processor 235. In either embodiment, the processing unit 202 is adapted for cooperation and communication with the processor 235 and other components of the computing device 200 via signal line 222.

The processing unit 202 obtains information about users from user input and/or prior actions of a user across a range of heterogeneous data sources including search (for example, web, video, news, maps, alerts), entertainment (for example, news, video, a personalized homepage, blogs, a reader, gadget subscriptions), social activity (for example, interactions through electronic messages, profile information, text messaging for example, short message service (SMS), microblogs, geographical locations, comments on photos, a social graph, and other social networking information) and activity on third-party sites (for example, websites that provide ratings, reviews, and social networks where users indicate that they approve of content). This information is derived, for example, from a user's search history, browsing history and other interactions with the Internet. The processing unit 202 processes the information.

In some implementations, there are multiple processing units 202 that each receive data from a different heterogeneous data source. In some implementations, the data is received by the same processing unit 202. The processing unit 202 transmits the processed information to memory 237 for storage. In some implementations, the memory 237 partitions the data from each heterogeneous data source in a separate data storage location. In some implementations, the data from heterogeneous data sources is stored in the same location in the memory 237. In some implementations, the memory 237 partitions the model and the stream of content into separate storage locations as well.

The model generation engine 207 is software including routines for retrieving the processed information from the memory 237 or receiving it directly from the processing unit 202 and generating a model for a user based on the processed information. In some implementations, the model generation engine 207 is a set of instructions executable by the processor 235 to provide the functionality described below for generating the model. In some implementations, the model generation engine 207 is stored in the memory 237 of the computing device 200 and is accessible and executable by the processor 235. In either embodiment, the model generation engine 207 is adapted for cooperation and communication with the processor 235 and other components of the computing device 200 via signal line 224.

The model generation engine 207 receives user information from a variety of sources including, for example, queries, clicks, gadgets, electronic messages, etc.; determines features from the information; and generates a model based on the determined features. The model consists of various types of relevance of items to users, along with floating point values to indicate the extent to which the relevance holds. Examples include liking a source, a primary location, and a list of interests. The interests are generated from explicit information and inferred information. Explicit information is derived, for example, from a user's list of interests on a social network or indicating that they approved of a particular content item. Inferred information takes into account a user's activities.

In some implementations, the model generation engine 207 also generates a model that contains several pieces of global meta-information about the user's consumption patterns including how frequently the user consumes the stream of content and global statistics on how likely the user is to reshare various types of items. Lastly, the model includes a sequence of weights and multipliers that are used to make predictions about the user's likelihood of clicking on, sharing, or otherwise engaging with content stream items.

The model generation engine 207 generates the model from the data across the heterogeneous data sources. In some implementations, the model generation engine 207 builds extensions to the model that employ the patterns of behavior of other users. For example, the model predicts the user's behavior based on the reaction of similar users. The data for the other users can be anonymized before it is incorporated into the model.

The contextual module 213 is software including routines for identifying contextual clues from a request for a content stream for a user and from a request for a channel. In some implementations, the contextual module 213 is a set of instructions executable by the processor 235 to provide the functionality described below for identifying contextual clues. In some implementations, the contextual module 213 is stored in the memory 237 of the computing device 200 and is accessible and executable by the processor 235. In either embodiment, the contextual module 213 is adapted for cooperation and communication with the processor 235 and other components of the computing device 200 via signal line 214.

In some implementations, the contextual module 213 receives a request for a stream of content for a user or a request for a channel each time the user visits the website or activates an application that includes the channel application 103. In some implementations, the user requests the stream of content or requests the content stream from the channel.

In any case, the contextual module 213 receives the request and determines contextual clues from the request. For example, the contextual module 213 determines the location of the user (based, for example, on the user's IP address), the time of day, and any other contextual clues. The contextual module 213 transmits the contextual clues to the scoring engine 211 via signal line 214.

The scoring engine 211 is software including routines for generating a stream of content for a user or a channel from candidate content items and for personalizing a channel for a user. In some implementations, the scoring engine 211 is a set of instructions executable by the processor 235 to provide the functionality described below for generating a stream of content for a user and for personalizing a channel for a user. In some implementations, the scoring engine 211 is stored in the memory 237 of the computing device 200 and is accessible and executable by the processor 235. In either embodiment, the scoring engine 211 is adapted for cooperation and communication with the processor 235 and other components of the computing device 200 via signal line 225.

In some implementations, the scoring engine 211 queries heterogeneous data sources for candidate content items related to search terms, receives the candidate content items and compares the candidate content items to the model to determine whether the user would find the candidate content items interesting. The heterogeneous data sources include a search engine 143, an entertainment server 137, an electronic messages server 141, a ratings server 139, a social network server 101, and a third-party server 107 as illustrated in FIG. 1A.

When the request is for a user, the query is derived from the user's interests, social connections and, in some implementations, recent search terms input by the user. When the request is for a channel, the query includes the topic and keywords for the channel. In some implementations, the scoring engine 211 also uses contextual clues transmitted from the contextual module 213 to further narrow the number of candidate content items.

In some implementations, the scoring engine 211 first performs the query and then compares the results to the model to determine whether the user would find them interesting. In some implementations, these steps are performed simultaneously. In some implementations, the scoring engine 211 compares candidate content items to the model and then filters the results according to the subject matter of the queries.

The scoring engine 211 determines interestingness based on social relevance and an interest match between the item and the user. Social relevance can be used to measure a likelihood that the user would be interested in an item based on information from the user's social graph (e.g., how other people with similar demographics reacted to an item). For example, if the user is 13 and enjoys pop music, the user might be interested in content items about a new artist named Artist X. The interest match of the item to the user is determined based on similarity of the content item to the model.

Interestingness is measured by calculating a score for each candidate content item. In some implementations, the scoring engine 211 incorporates historical interaction feeds into the scoring. In some implementations, the candidate items are not displayed unless their candidate scores exceed a certain threshold. Once the scores are calculated and thresholds are exceeded, the scoring engine 211 generates a stream of content for a user that is ordered according to the candidate content item scores.

In some implementations, the scoring engine 211 also generates an explanation for each item in the stream of content for a user. The explanation is presented in a variety of ways including a tag that contains the subject matter of the content item (skiing) or a more detailed explanation (your friends enjoyed this article). Other explanations include that the content item matches a specific user interest or is similar to other content items that the user has liked in the past. The user's reaction to the explanation is used to further refine the model. This process is discussed in more detail below in connection with FIG. 3A, which illustrates a more detailed block diagram of the scoring engine 211.

In some implementations, the scoring engine 211 personalizes a channel for a user. The scoring engine 211 receives the stream of content for the channel from the channel engine 220. In some implementations, the scoring engine 211 queries the data storage server 265 or the memory 237 for candidate content items based on the topic and keywords for the channel. The scoring engine 211 compares the candidate content items to a model and calculates a score for each candidate content item using the model and based upon interestingness of the candidate content item to the user. In some implementations, the scoring engine 211 receives the contextual clues from the contextual module 213 and uses the contextual clues to further narrow the number of candidate content items.

In some implementations, the scoring engine 211 selects a set of content items from the candidate content items according to their scores. The scoring engine 211 identifies the content items in the selected content items and in the stream of content for the user, removes the duplicate content items from the selected set of content items and generates a stream of content for the channel (e.g., a personalized channel for the user) from the selected content items for a user. In some implementations, the scoring engine 211 distributes the personalized channel for the user into the overall content stream for the user.

Referring back to FIG. 1B, the collaborative filtering engine 217 is software including routines for generating additional candidate content items with a social component through collaborative filtering and transmitting the additional candidate content items to the scoring engine 211 that were derived from collaborative filtering. In some implementations, the collaborative filtering engine 217 is a set of instructions executable by the processor 235 to provide the functionality described below for generating additional candidate content items. In some implementations, the collaborative filtering engine 217 is stored in the memory 237 of the computing device 200 and is accessible and executable by the processor 235. In either embodiment, the collaborative filtering engine 217 is adapted for cooperation and communication with the processor 235 and other components of the computing device via signal line 226.

The collaborative filtering engine 217 obtains candidate content items that are socially relevant from a stream of content for a user derived from people with whom the user has a relationship and transmits the candidate content items to the scoring engine 211. The collaborative filtering engine 217 receives information about the relationships from the social graph. For example, the stream of content for a user is derived from friends in a social network or people that the user frequently sends electronic messages to. The more important that the person appears to be to the user, the more likely that the user will be interested in the content item. Thus, in some implementations, the collaborative filtering engine 217 applies a weight to candidate content items based on the social relationship of the user to the friend. For example, users that are friends receive higher weights than candidate content items from second-generation friends of the user (e.g., a friend of a friend).

The collaborative filtering engine 217 increases the weights applied to candidate content items from friends when the user positively responds to the items. For example, if the user comments on the item or indicates that the user found the item interesting, the collaborative filtering engine 217 increase the weight so that more candidate content items from the friend become part of the stream of content for the user.

The channel engine 220 is software including routines for generating a channel for a topic, retrieving candidate content items based on the topic and keywords, generating a stream of content for the channel from the candidate content items and populating the channel with the stream of content for the channel. In some implementations, the channel engine 220 is a set of instructions executable by the processor 235 to provide the functionality described below for generating the channel populated with the stream of content for the channel. In some implementations, the channel engine 220 is stored in the memory 237 of the computing device 200 and is accessible and executable by the processor 235. In either embodiment, the channel engine 220 is adapted for cooperation and communication with the processor 235 and other components of the computing device 200 via signal line 227.

In some implementations, the channel engine 220 determines a topic for a channel (e.g., bicycler) and identifies corresponding keywords (e.g., bicycle, bike, bicycling, biking, cycle, cycling, racer). In some implementations, the channel engine 220 receives a request for creating a channel from third parties or individuals. The request for creating a channel includes a topic and possibly a brief description of the channel that the channel engine 220 uses to generate keywords. For example, the channel engine 220 receives a request for creating a channel for a topic of birds. In some implementations, the channel engine 220 determines the keywords for this channel of birds, for example, birds, parrots, cockatiels, eagles, owls, pigeons, etc. The channel engine 220 generates a channel for the determined topic.

The channel engine 220 queries heterogeneous data sources for candidate content items based on the keywords, receives the candidate content items and selects a set of content items from the candidate content items according to global scores assigned to the items by the scoring engine 211. The heterogeneous data sources include a search engine 143, an entertainment server 137, an electronic messages server 141, a ratings server 139, a social network server 101, and a third-party server 107. The query is derived from the keywords associated with the topic. For example, the channel engine queries the search engine 143 for items including gourmet, cuisine and restaurant because the topic of the channel is gourmand.

In some implementations, the channel engine 220 first performs the query based on keywords and then selects the results according to their global scores. For example, the channel engine 220 selects a set of content items, each with a global score exceeding, i.e., more than, a threshold amount, from the candidate content items. In some implementations, the query and selection are performed simultaneously, i.e., the channel engine 220 queries heterogeneous data sources for candidate content items based on the keywords and their global scores. For example, the channel engine 220 queries the data storage server 265 for items containing skiing and with global scores higher than 80. The data storage server 265 is described in greater detail below with reference to FIG. 2. In some implementations, the channel engine 220 selects from the candidate content items based on their global scores and then filters the results according to the keywords. In many of these examples, the channel engine 220 receives a set of candidate content items related to the topic with high popularity.

The channel engine 220 generates a stream of content for the channel using the selected content items and populates the channel with the stream of content for the channel. Once the channel is created, the channel engine 220 transmits the stream of content for the channel to the user interface engine 230 for incorporation into a user interface that is transmitted as a data collection to users. In some implementations, the stream of content is stored in the memory 237 for a data storage server 265.

In some implementations, the channel engine 220 updates the channel periodically (e.g., an hour, a day, a week or a month), invites, and accepts people to join the channel as members/users. The channel engine 220 also receives input or activities from users through the user interface engine 230 and publishes the activities in the channel.

In some implementations, the channel engine 220 determines a reputation for each user in the channel based on reactions to the user's submitted content and according to a level of satisfaction of some rules. The channel engine 220 assigns a reputation to users that indicates that they are trustworthy when the users submit content that a threshold number of other users read, watch, or positively react to by submitting comments or providing indications of approval for the content. For example, the channel engine 220 assigns a high reputation indicating trustworthiness when the user exceeds a threshold. In some examples, the channel engine 220 assigns a low reputation indicating trustworthiness when the user exceeds a threshold.

The channel engine 220 determines whether to publish content items submitted by the users in the channel based on the reputations of the users and arranges the content items in the stream of content for the channel according to a ranking of the content. In some implementations, the channel engine 220 automatically publishes the content items submitted by users with high reputations in the channel. In some implementations, the channel engine 220 asks a moderator or a user with a high reputation for approval to publish content items from users with low reputations.

The channel engine 220 also deletes obsolete content items and items older than a certain period of time, for example, a month. In some implementations, the channel engine 220 identifies the content items in the stream of content for the channel and in a stream of content for a user as well, removes duplicate content items from the stream of content for the channel, and distributes the stream of content for the channel into the stream of content for the user. In some implementations, the channel engine 220 transmits the stream of content for the channel to the scoring engine 211 to remove the duplicates.

In some implementations, the channel engine 220 further refines the topic of the channel based on the activities of the users. In some implementations, the channel engine 220 divides a channel into two or more channels with related topics. For example, the channel engine 220 creates two new channels from the gourmand channel: one for vegetarian gourmands and another for meat-eating gourmands. In some implementations, a new channel with a narrowed topic is derived from a current channel based on user feedback. In some implementations, the channel engine 220 generates a new channel for a narrowed topic, for example, a sushi channel from a gourmand channel. A public stream of content with multiple users is referred to as a channel and is available for other users. The users join the channel and the channel appears as part of a user's stream of content. In some implementations, the channel is a bucket and each time a content item is placed in the bucket, the channel engine 220 automatically routes the item to the user. In some implementations, the user selects the channel button generated by the user interface engine 230 to view the items in the bucket.

There are three different ways to implement a channel: (1) an algorithmic channel; (2) a moderated channel; and (3) an un-moderated channel. The user inputs information for creating an algorithmic channel by specifying different entities and sources (e.g., five, 15, 20, etc.) that collectively pull together content about a particular interest. Other users subscribe to the channel by following it or indicating that they approve of the stream of content. Other implementations are possible. For example, a channel can be a mix of two or more of the ways described.

For a moderated channel, at least one moderator is specified. In some implementations, the creator of the channel is automatically designated as a moderator. Other moderators are designated via the user interface. The user interface engine 230 presents the moderator with candidate content items to include in the channel from various places including items that match a query for the specified interest and other users. When the moderator approves a candidate content item, it appears in the content stream for the channel. Other users offer content to the channel by indicating that they approve of an item in their content stream. Content items from other users are designed as candidate content items until the moderator approves or rejects them.

For an un-moderated channel, any user can join the channel and add an item to the channel's content stream by approving of an item. Approved items are sorted by their global scores and subsequently modified in response to the item receiving many views, indications of approval and comments from users that are members of the channel. By rearranging the content items according to user responses, the stream of content of the channel is effectively moderated.

The user interface engine 230 is software including routines for generating a user interface that displays the stream of content for a user including an overall stream of content and a channel stream of content, receives user feedback, allows the user to add or remove explicit interests, and generates a widget for display on websites that include an option to share the articles in the channel. In some implementations, the user interface engine 230 is a set of instructions executable by the processor 235 to provide the functionality described below for displaying a stream of content for a user or a channel. In some implementations, the user interface engine 230 is stored in the memory 237 of the computing device 200 and is accessible and executable by the processor 235. In either embodiment, the user interface engine 230 is adapted for cooperation and communication with the processor 235 and other components of the computing device 200 via signal line 261. In one example, the user interface engine 230 also displays suggestions for channels that the user could join.

FIG. 2 is a block diagram illustrating some implementations of a system for generating a channel from data sources. In this embodiment, the components of the channel application 103 are divided among various servers so that the information is efficiently processed. The system includes a search server 135, an entertainment server 137, a ratings server 139, an electronic messages server 141, a content acquisition pipeline 250, a data storage server 265, a model server 255, a scoring server 260, a social server 270, and a channel application 103.

The heterogeneous data sources (e.g., the search server 135, entertainment server 137, ratings server 139, and electronic messages server 141) are crawled by a content acquisition pipeline 250. In some implementations, the heterogeneous data sources transmit the content items to the content acquisition pipeline 250.

The content acquisition pipeline 250 includes a processing unit 202 for annotating the content items with specific tags, for example, features and a global score that was generated by the scoring engine 211 and processing user activities. The activities described herein are subject to the user consenting to data collection. Once the content items are annotated, the processing unit 202 transmits the data to the data storage server 265. The data storage server 265 indexes the features of each content item and stores them in at least one database. In some implementations, the content items are organized according to an identification format (SourceType#UniqueItemID, for example, "VIDEOSERVICE #video_id" and "NEWS#doc_id"), an item static feature column that holds an item's static features (title, content, content classification, etc.), an item dynamic feature column that holds an item's dynamic features (global_score, number of clicks, number of following, etc.), a source (src) static feature column where the source is a publisher of an item (News Source in news, video uploading in YouTube, etc.), a src dynamic feature column holds the source's dynamic features, a content column holds activities that were used to create activities and a scoring feature holds a message that is used for user scoring.

In some implementations, the data storage server 265 dynamically phases out the content items. For example, news items expire after 24 hours, videos expire after 48 hours, and feeds are kept for 24 hours or only the 10 most recent items, whichever is larger.

The content acquisition pipeline 250 also transmits the content items to the scoring server 260 for a global user ranking. The global scores are transmitted from the scoring server 260 to the data storage server 265, which stores the global scores in association with the content items. The global scores are helpful for organizing the content items in the data storage server 265.

Turning now to the model server 255, the model server 255 receives the user activity from the processing unit 202 or the data storage server 265. The model generation engine 207 generates the model based on user input and/or prior actions. The model server 255 transmits a model to the scoring server 260 periodically or upon request.

In some implementations, the scoring server 260 requests the model responsive to receiving a request for a stream of content for a user or a request for a channel from the user. The scoring server 260 receives the model from the model server 255. The scoring server 260 requests and receives user candidates from the social graph. The scoring server 260 requests and receives candidate content items from the data storage server 265. The scoring server 260 requests and receives candidate content items from the social server 270. The candidate content items from the social server 270 are pre-scored and, in some implementations, the unread candidate content items are saved to a cache on the social server 270. These items are saved to a cache because the quantity of social updates can be large enough that performing the scoring during write time enables faster reads.

The scoring engine 211 compares the candidate content items to the model and scores the candidate content items.

In the case of candidate content items from the social server 270, the scoring engine 211 receives the candidate content items from the social server 270, compares the candidate content items to the model and rescores the candidate content items according to the model. The scoring engine 211 generates a stream of content for a user based on the scored candidate content items and transmits the stream of content for a user to the channel application 103.

The channel application 103 includes a channel application 103 as described above and a user interface engine 230 that receives the stream of content for a user from the scoring server 260 and displays it in a user interface. In some implementations, the user interface engine generates a widget for display on third-party websites that allows a user to share content with the channel. Additionally, the user interface provides the user with a user interface for changing the settings and modifying user interests. The icons will be explained in greater detail below with regard to FIG. 4.

Figure 3A:
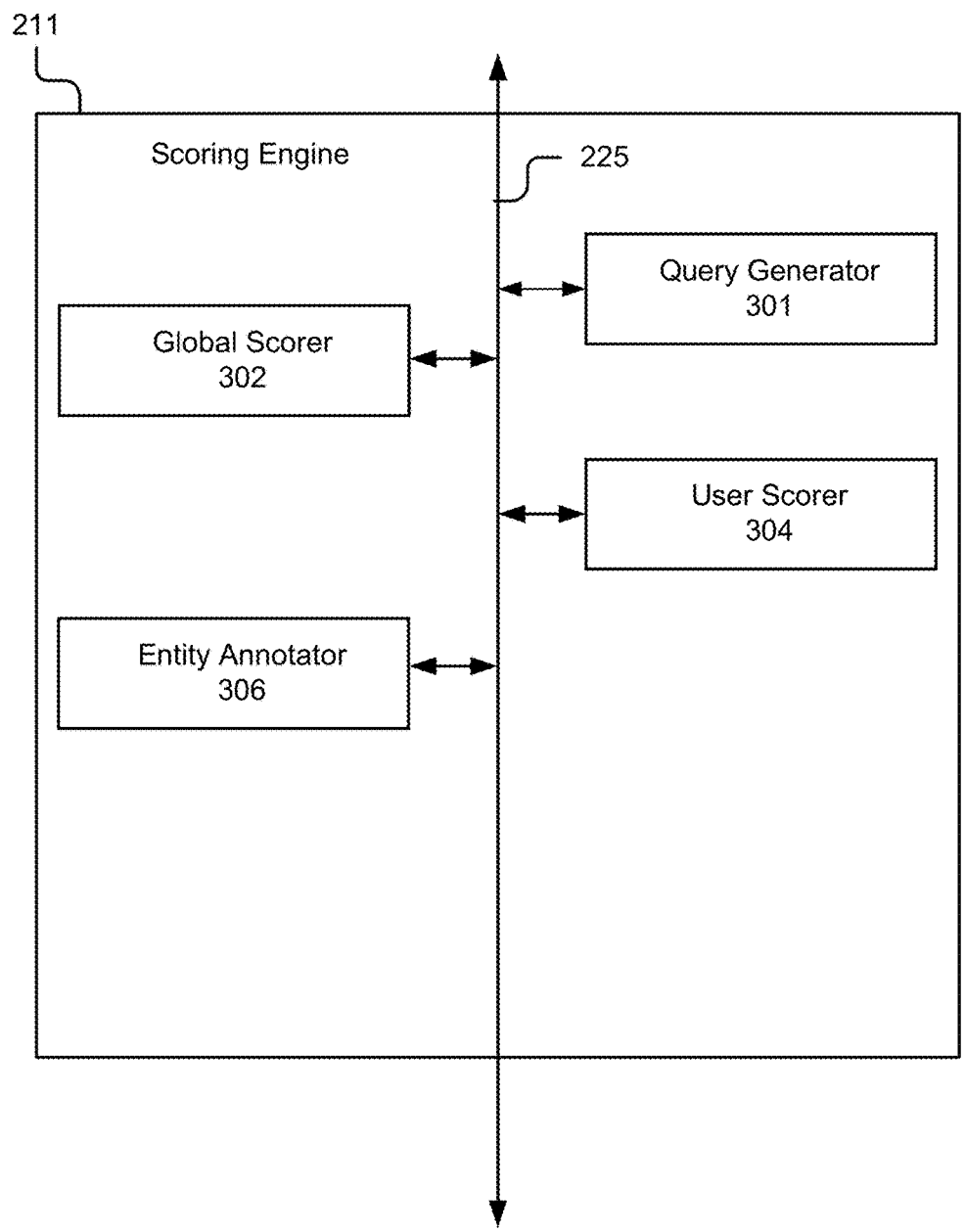
FIG. 3A is a block diagram of an example scoring engine in more detail.

Referring now to FIG. 3A, some implementations of a scoring engine 211 is shown in more detail. This embodiment is discussed in conjunction with FIG. 2. The scoring engine 211 includes a query generator 301, a global scorer 302, a user scorer 304, and an entity annotator 306 that are each coupled to signal line 225.

The global scorer 302 is used to rank all content items that are stored in the data storage server 265 or memory 237 (depending upon the embodiment). The global scorer 302 uses signals from the different verticals to compute a global user-independent score for each content item to approximate its popularity or importance within the stream that produced it. The global scorer 302 normalizes the score across streams so that items from various streams are comparable to aid in generating a quick yet reasonable ranking of items. The global score is a combination of its quality specific to the source stream (depending on the rank of the source, number of known followers of a source, etc.) and its global popularity (trigger rate on universal search, relevance to trending queries, number of clicks, long clicks received, etc.).

The global scorer 302 transmits the global score to storage where it is associated with the content item. The global score helps rank the content items for faster retrieval. For example, if the query generated by the query generator 301 includes a request for the top ten items about skiing, those items are already organized in the data storage server 265 or memory 237 according to the global score.

The query generator 301 generates a query for users that would find a content item interesting. There are two types of queries: the first suggests users based on their interest in the item and the second suggests users based on their social connection to the item.

For an interest based query, a candidate content item is interesting to the user and must exceed a quality threshold based on the user's interest. The quality threshold contains components covering the global quality of the item, and the quality with respect to the user's location, as well as optionally a set of additional quality scores for example the burstiness and geo-burstiness of the item. Burstiness refers to the extent to which the item's popularity has sharply increased. Geo-burstiness refers to the extent to which the item's popularity has sharply increased compared to average activity in a specific geographic area.

The following is one form of the query associated with a user: ((llama_farming AND (global_score># OR local_score># OR burstiness>#)) OR (from_techwebsite AND (global_score># OR local_score># OR burstiness>#)) OR ( . . . ). The user may be moderately interested in llama farming and good material on this subject may be hard to find, yielding a relatively low threshold on global score and the other scores. The user is less interested in content from the technology website and this content is higher in both volume and quality, so the resulting threshold is higher to gate the technology website content to an appropriate flow rate. These thresholds are recomputed nightly based on the activity during the day.

The query is transmitted to the social graph database and the user scorer 304 receives the candidate content items from heterogeneous data sources through the content acquisition pipeline 250 or the data storage server 265 and receives the list of users associated with the candidate content items from the query generator 301. In some implementations, the user scorer 304 receives candidate content items directly from the source, for example, from a microblog. The user scorer 304 then computes a score for a single user and item pair based on the model, including user preferences for various types of content items, including suitable multipliers for the scoring model and the complete description of the item, including the entities it refers to and its various popularity signals (global and geo-specific popularity, both in absolute terms as well as in the rise in popularity).

In some implementations, the query generator 301 also generates queries for the users who want a channel shown in their user interfaces. The queries are used to retrieve content items from channels based on the topic. For example, when a user wants a channel of sharks displayed, the query generator 301 generates queries that includes sharks and other terms for sharks.

In some implementations, the user scorer 304 generates an activity identification, a user identification, an action type (e.g., recommendation of candidate content item for stream of content), a score, a score version, a score timestamp, a stream type (e.g., YouTube, feed, news, SMS, etc.), a stream source (e.g., newspaper X, school Y, etc.), and a bloom filter.

In some implementations, the user scorer 304 employs a probabilistic method that evaluates the probability that an item will be present in a user's stream. The random variables used to compute this probability are the lattice of various subsets of properties (entities, global and local scores, source type, source, etc.) shared between the item and the user. For a suitably rich set A of attributes, the random variable "item" is independent of the random variable "user," given the values of the attributes A. Thus, for any setting {A=a} of the attributes, Pr(item|A=a, user)=Pr(item|A=a). Therefore, summing over all possible values a of A; obtains $$Pr(\text{item} \mid \text{user}) = \sum_p Pr(\text{item} \mid p) Pr(p \mid \text{user}),$$

where p is a property, that is, a setting A=a of the attributes. The latter quantity, Pr(p|user), is something we can approximate from the user's history of interactions with content items as well as user search history and other opt-in data. Similarly, the former quantity, Pr(item|p) is something we can approximate by the (suitably weighted) reciprocal of the number of items with property p (e.g., if it is expected that p=(llama_farming AND (global_score># OR local_score># OR burstiness>#) to generate 300 items, take Pr(item|p) to be 1/300).

The difficulty of computing Pr(item|user) by the sum above is that the properties expressed in the query corresponding to the user are not independent, and may have correlations to take advantage of To support this, the user scorer 304 begins with very simple approximations of the following form as a first step:

$$Pr(\text{item} | \text{user}) = G^{-1}\left(\sum_p G(Pr(\text{item} | p)Pr(p | \text{user}))\right),$$

where the properties p are summed over single-attribute properties (as opposed to all possible settings of an entire collection of attributes), and G is an exponential function of the form $G(x)=2^{(100 \cdot x)}$, so that when applied in this form, if there are several values of p for which Pr(item|p) Pr(p|user) is large, the sum of their G-values slowly increases.

Referring back to FIG. 3A, the entity annotator 306 generates descriptions for each content item. In some implementations, the entity annotator 306 generates a description for all content items that are stored in the data storage server 265 in association with the content item. In some implementations, the entity annotator 306 generates an explanation for why items were included in the stream of content for a user based on the user's interests. The explanations are categorized as social (your friend approved/shared/commented on this), entities (because you approve of monster trucks), queries (because you search for/are interested in [P-38 lightning model airplanes]) and geographic. In some implementations, the entity annotator 306 incorporates collaborative explanations (because people from school Y/company/etc. approved of this) and some named collaborative explanations (because your brother approves of a comic).

The entity annotator 306 also generates a feedback mechanism that is displayed with the explanation, for example, approve or disapprove, etc. In some implementations, the explanation is displayed as a decision tree from a broad subject area to narrower subject areas.

The stream of content for a user is included in a user interface that allows the user to share the item with friends, comment on the item, save the item, etc. By sharing the content items with friends, the stream of content for a user is circulated throughout the social network. In some implementations, the scoring engine 211 automatically distributes content items to friends based on a determined commonality, for example, sharing pictures of the user's friends with all family members. As a result, a user's stream of content becomes a combination of information retrieved from websites and content obtained through friends. This keeps the content interesting and the results fresh.

When a user responds to the explanation by providing feedback, the feedback is transmitted to the model generation engine 207 for incorporation into the model. The feedback loop establishes a dynamic model, which is important for two reasons. First, feedback helps train the model when generating the model for the first time. The model is created in part from inferences and these inferences can be wrong. Feedback helps create the most accurate model possible. Second, people's interests change and incorporating the feedback makes the model evolve to reflect those changes. For example, a user's taste in music changes such that the user is interested in a particular artist now because she's new but eventually the user will become bored of her music or find better artists. As a result, there will be a point where the user is no longer interested in seeing content items about that particular artist. Incorporating user feedback into the model therefore makes the model stay relevant to the user.

Figure 3B:
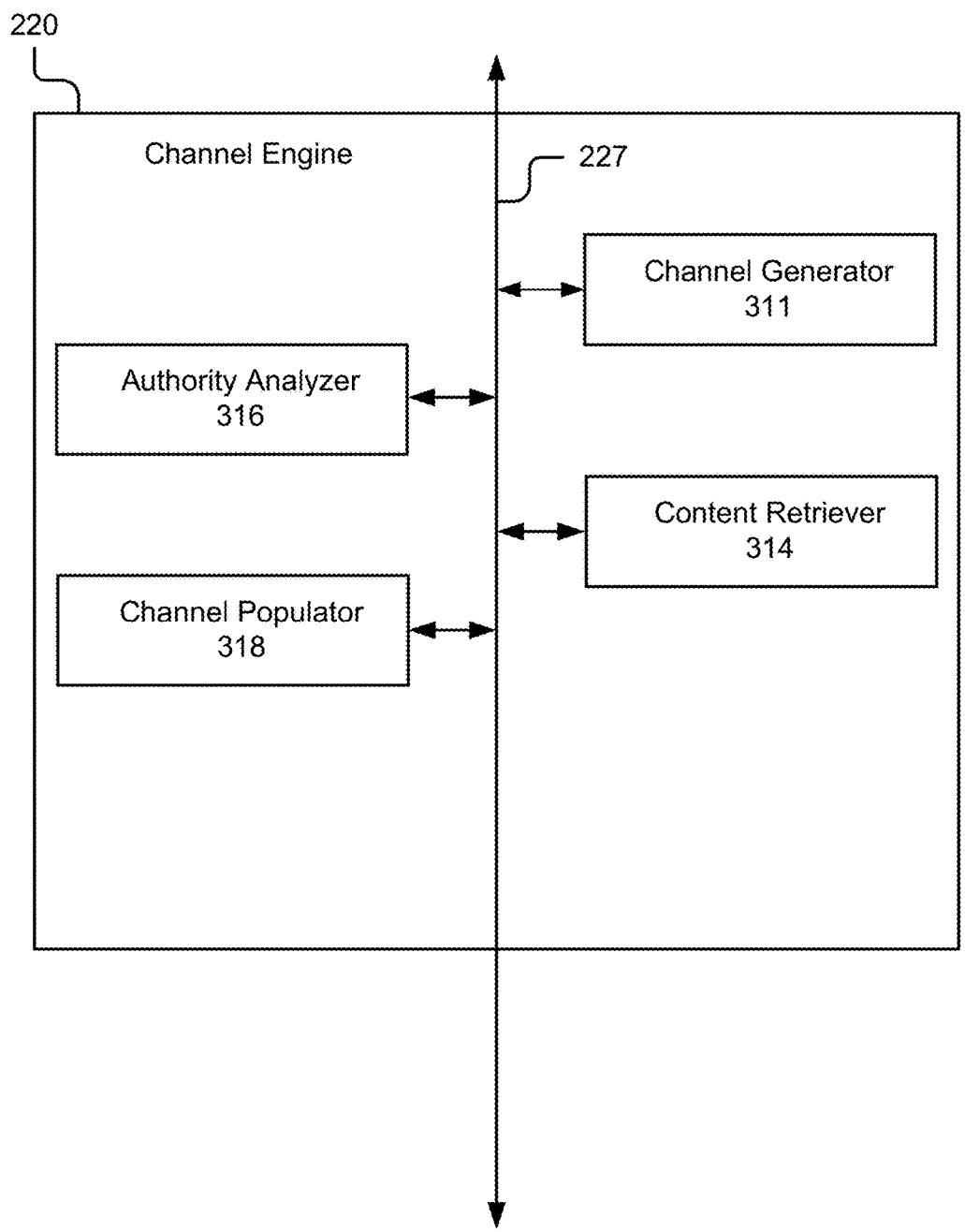
FIG. 3B is a block diagram of an example channel engine in more detail.

Turning now to FIG. 3B, some implementations of a channel engine 220 is shown in more detail. This embodiment is discussed in conjunction with FIG. 2. The channel engine 220 includes a channel generator 311, a content retriever 314, an authority analyzer 316 and a channel populator 318 that are each coupled to signal line 227.

The channel generator 311 creates and manages channels with a topic and associated keywords. The channel generator 311 determines a topic and keywords that correspond to the topic, and generates a channel for the topic. In some implementations, the channel generator 311 queries heterogeneous data sources for the most popular topics or determines topics from the content items with global scores that exceed a threshold amount stored in the data storage server 265 or memory 237 (depending on the embodiment). For example, the channel generator 311 creates a topic for fashionistas from the search history for a period of time. In some examples, the content items with global scores exceeding a threshold (e.g., scores indicating popularity or importance) is about artist P and then the channel generator 311 determines a topic of the artist P.

In some implementations, the channel generator 311 first determines a topic and then determines the keywords related to the topic. In some implementations, the channel generator 311 first determines keywords from the popular content items, categorizes the keywords, and then determines a topic from each category of the keywords. For example, the popular keywords include stroller, diaper and premie. From these keywords, the channel generator 311 identifies the topic as babies.

In some implementations, the channel generator 311 receives requests for creating channels from third parties or individuals. The request contains a topic and, in some examples, a brief description of the topic. The channel generator 311 then generates a channel for the topic and determines the keywords for the topic based on synonyms and the brief description if present.

The channel generator 311 maintains a list of members associated with a channel. In some implementations, the channel generator 311 adds any user to the group that wants to join. In some implementations, the channel generator 311 transmits requests to join to a moderator that approves the request before the user is added to the group.

In some implementations, the channel generator 311 receives user profiles and generates a recommendation for users to join channels that include a topic or keyword that matches or is similar to the user profile. For example, a user that includes biking as an interest might be interested in a channel for mountain biking. The channel generator 311 transmits the recommendation to the user interface engine 230, which displays the recommendation to the user.

In some implementations, the channel generator 311 receives feedback from users about the channel and modifies the topic accordingly. For example, if the channel generator 311 receives disapproval of certain content items, the channel generator 311 modifies the topic to avoid presenting similar content items in the future.

In yet some implementations, a user seeds the channel by submitting content items to the social generator 311. The channel generator 311 identifies the topics of the content items and adds the topics to the channel topics and keywords. The channel generator 311 then transmits the content items to the channel populator 318 for incorporating the content items into the stream of content.

The content retriever 314 generates queries based on the topic and keywords. In some implementations, the queries also include global scores associated with content items. For example, the following is one form of the query for the topic of gourmand: ((from_foodiewebsite AND global_score># OR burstiness>#) OR (béchamel AND global_score>#) OR ( . . . ). In some implementations, the content retriever 314 queries heterogeneous data sources for candidate content items based on keywords and then selects a set of content items with global scores higher than a threshold from the candidate content items. In yet some implementations, the content retriever 314 generates queries only including a global score higher than a threshold and then retrieves the content items containing the keywords from the results of the first query.

Once the channel generator 311 creates the channel, the content retriever 314 periodically generates queries and retrieves candidate content items for feeding the channel. In some implementations, the content retriever 314 also updates the keywords and the queries periodically, for example, once a week, to accommodate the changing trends. For example, the content retriever 314 adds keywords that recently became popular, removes keywords for outdated trends, and adjusts the global score threshold for each group of content items to reflect the changes. In the example of gourmand, the query becomes ((from_foodiewebsite AND global_score># OR burstiness>#) OR (béchamel AND global_score>#) OR (sushi AND global_score>#) OR ( . . . ). Because sushi is a trending toping, sushi is added as a keyword and, as a result, the content retriever 314 adds sushi to the query. Similarly, béchamel is becoming a more popular topic, so the threshold for content items related to béchamel is adjusted lower to get a higher flow rate of the content items related to béchamel.

The authority analyzer 316 receives the activities of members of the channels. In some implementations, the authority analyzer 316 categorizes the activities into two groups: user-submitted content items and responses to existing content items. In some implementations, the authority analyzer 316 also identifies a user-submitted content item as original or transferred from other data sources. In some implementations, the authority analyzer 316 labels the content items according to its media type, for example, video, an image, music, a blog post, an article, a message, a microblog post, news, etc. The authority analyzer 316 weights each content item according to the closeness of a content item to the channel topic and keywords, originality, and media types. The weights become associated with the user's reputation and a high weight results in a reputation for being trustworthy or, in another example, a low weight results in a reputation for being trustworthy. For example, the user who submits an original item obtains more weights than the user who transfers an item from elsewhere. The authority analyzer 316 publishes the user-submitted content item based on the weights assigned to the content item and the user's reputation.

In some implementations, the authority analyzer 316 generates and updates a reputation for each user in the channel according to reactions to user submitted content. The factors used to determine a user's reputation includes a number of users that read, watch or comment on the user's submitted content items. For example, the authority analyzer 316 assigns a more trustworthy reputation to a user that submits videos, pictures, posts, articles, and any other items submitted by a user having more than 200 readers, watchers or participants than a user that submits content items that have 100 readers, watchers or participants. The first user is deemed to be a better identifier of popular content items. Similarly, a number of comments submitted by other users and a number of indications of approval of the content items submitted by the user are also used to rate each user in the channel. The reputation of a user is proportional to the number of the readers, watchers, or participants, the number of comments, and the number of approvals.

In some implementations, the authority analyzer 316 assigns a reputation level to each user in the channel. For example, the authority analyzer 316 assigns a low, medium or high reputation. In some implementations, the authority analyzer 316 also uses the weights associated with the user-submitted items to determine a reputation for the user. In some implementations, the authority analyzer 316 uses a score to represent a reputation. For example, a higher reputation is indicated by a score higher than 100. In some implementations, the authority analyzer 316 assigns the user a badge to indicate the user's reputation, for example, a star. The more stars the user has (or the star is assigned a particular color that denotes the user's reputation level), the higher reputation the user has. In some implementations, the badges include high rank badges or low rank badges, for example, a gold badge represents a higher rank than a silver one. In some implementations, the badge is generated from all user activity, e.g., a reaction to all user-submitted content items across channels. In this example, a major concern is to prevent people from spamming a channel and a user is unlikely to spam one group but not another group. In some implementations, the badge is specific to each channel. In this example, the badge is associated with a group so that people with an amateur interest in a subject are not clogging up a content stream with irrelevant content that would annoy more experienced members.

The authority analyzer 316 ranks each candidate content item based on the reputation of the user who submits the candidate content item and arranges the candidate content items according to the ranking In some implementations, the authority analyzer 316 asks a moderator or a user with a trustworthy reputation for approval of publication of content items from a user with an untrustworthy reputation. In some implementations, the authority analyzer 316 automatically includes the content items submitted by users in the set of the candidate content items as long as the content item exceeds a threshold global score. The authority analyzer 316 transmits the arranged candidate content items to the channel populator 318.

In some implementations, the channel populator 318 receives the candidate content items from the content retriever 314, arranges the items according to their global scores, generates a stream of content for the channel using the candidate content items, and populates the channel with the stream of content for the channel. In some implementations, the channel populator 318 receives arranged candidate content items from the authority analyzer 316, generates a stream of content for the channel using the arranged candidate content items, and populates the channel with the stream of content for the channel.

In some implementations, the channel populator 318 receives a variety of content items from the channel generator 311 that a user submitted to seed the channel. In some implementations, the user submits items at the creation of the channel to help define the topic and keywords. In some implementations, the user periodically submits additional items to maintain relevant topics and keywords.

In some implementations, the channel populator 318 deletes obsolete content items or items older than a period of time, for example, a week, from the stream of content for the channel. The channel populator 318 updates the stream of content for the channel accordingly. The channel populator 318 transmits the stream of content for the channel to the data storage server 265 or the memory 237 (depending on the embodiment) for storage.

In some implementations, the channel populator 318 transmits a first stream of content for the channel to the scoring engine 211 to identify content items in the first stream of content for the channel and a second stream of content for a user, removes duplicate content items from the stream of content for the channel, and distributes the stream of content for the channel into the stream of content for the user.

In some implementations, other users can subscribe to a user's personalized stream of content for a channel. People might find this feature particularly interesting if the user is a celebrity. For example, people interested in technology would enjoy reading a stream of content that is about technology and is personalized for the founder of a large technology company. This would give users insight into what type of nuanced content the founder finds interesting.

Figure 4:
FIG. 4 is a graphic representation of a user interface that includes the channel.

FIG. 4 is a graphic representation 450 of a user interface that is generated by the user interface engine 230 for displaying the personalized stream of content for a channel. In this example, the channel stream of content for a user is displayed as a product called Channel. The user interface includes a search bar 451 at the right top for querying a search engine. Other versions of the channel application 103 are possible that omit the search bar.

The user is Melissa Garcia and the user interface shows all the channels that Melissa has joined as a member. The user interface engine 230 displays the channel for gourmands 455. The user interface also suggests other channels 460 that Melissa might be interested in based on Melissa's explicit interests, Melissa's history behavior, Melissa's social connection with her friends, and the relevancy between these channels and the channels that Melissa has already joined as a member. For example, because Melissa is a member in the channel of Bicycler, she might be interested in other outdoor sports. As a result, the user interface suggests that she join the hiker channel. Additionally, the user interface provides the user with the top channels and shows the badge 462 that Melissa has already been awarded based on her reputation in the channels where she is a member.

The user interface further provides the user with the option of inviting people to join a channel where the user is a member and for a member's invitation 453 to join other channels. For example, if Melissa feels the gourmands channel is good, she invites her friends by clicking "invite people" button (not shown) to choose the friends she wants to invite. Similarly, her friends receive invitations for joining the gourmands channel on top of their channel user interfaces. Similarly, Melissa's friends invite her to join channels according to their experience in those channels. In this example, the user interface shows an invitation from Melissa's friend Rebecca Williams to invite her to join the vegetarians channel 453.

When Melissa clicks one of the channels, for example, gourmands, the personalized stream of content of the gourmands channel for Melissa is shown on Melissa's user interface. Melissa shares content items with other members of the gourmands channel by clicking the bar 457 and uploading or submitting anything she wants to share. Hot items 458 are shown with a comment 459 from Jessica Yu who is either Melissa's friend or a user with a trustworthy reputation in the gourmand channel. Other items are displayed with an order chosen by Melissa and the default order is sorting by ranking 465. Other options for sorting include global score, recency and relation to user (e.g., first order friends before people that are not friends).

Additionally, each content item is associated with some keywords 464 that are determined from the content item. Furthermore, the keywords are used to identify other channels, which the user interface advertises with the join buttons 456a and 456b for joining other channels. For example, the "Sushi shop" item 458 is displayed with a join sushi button 456a for joining the sushi channel. The join buttons for other channels are displayed if there is a relevancy between the channel indicated on the button and the user's interests.

The user interface displays the badges with the users in the channel. For example, the user Irene Alien 467 submits a post and the user interface shows the item and the user Irene Alien 467 together with her badges (e.g., a star).

Figure 5:
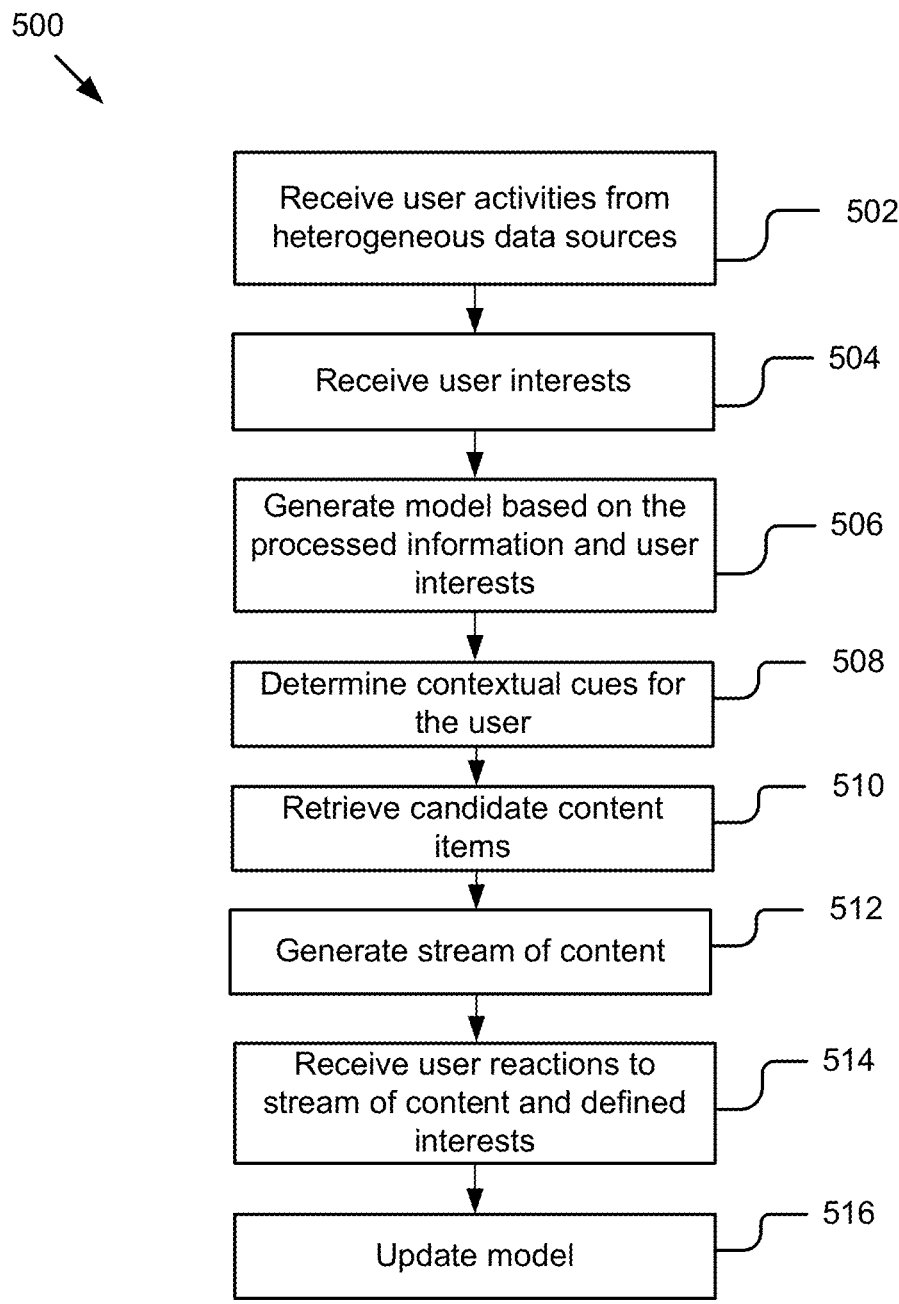
FIG. 5 is a flow diagram of an example of a method for generating a model based on user interests.

Referring now to FIGS. 5-8, various embodiments of the method of the specification will be described. FIG. 5 is a flow diagram 500 of some implementations of a method for generating a model. The processing unit 202 receives 502 user activities from heterogeneous data sources. The heterogeneous data sources include search (for example, web, video, news, maps, alerts), entertainment (for example, news, video, a personalized homepage, blogs, a reader, gadget subscriptions), social activity (for example, interactions through electronic messages, profile information, text messaging, for example, short message service (SMS), microblog, comments on photos, a social graph, and other social networking information) and activity on third-party sites (for example, websites that provide ratings, reviews, and social networks where users indicate that they approve of content). The processing unit 202 transmits the processed information to storage, for example, memory 237 or a data storage server 265 (depending upon the embodiment). The processing unit 202 also receives 504 user interests. The user interests are implicit or explicit.

The model generation engine 207 receives the processed information and generates 506 the model based on the processed information and user interests. If information specific to a user is unavailable, the model generation engine 207 creates a generic model based on global user activities. In some implementations, the model generation engine 207 generates a model each time the scoring engine 211 receives a request for a stream of content. In some implementations, the model is generated periodically.

The contextual module 213 determines 508 the contextual cues of the user. For example, the contextual module 213 determines that the user is located in San Francisco, Calif., is female and has recently searched for a recipe for making gazpacho. The scoring engine retrieves 510 candidate content items based on the contextual cues of the user. The scoring engine 211 generates 512 a stream of content by comparing candidate content items to the model. The user interface engine 230 generates a user interface that includes the stream of content and provides the stream of content to the user.

In some implementations, the stream of content includes an explanation for why at least one content item is being displayed to the user, for example, an explanation that it matches one of the user's defined interests. The user reacts to the stream of content, for example, by sharing a link, indicating that the link is interesting, or indicating that the suggestion was wrong. The model generation engine 207 receives 514 the user reactions to the stream of content and defined interests. Responsive to receiving the user reactions, the model generation engine 207 updates 516 the model.

Figure 6:
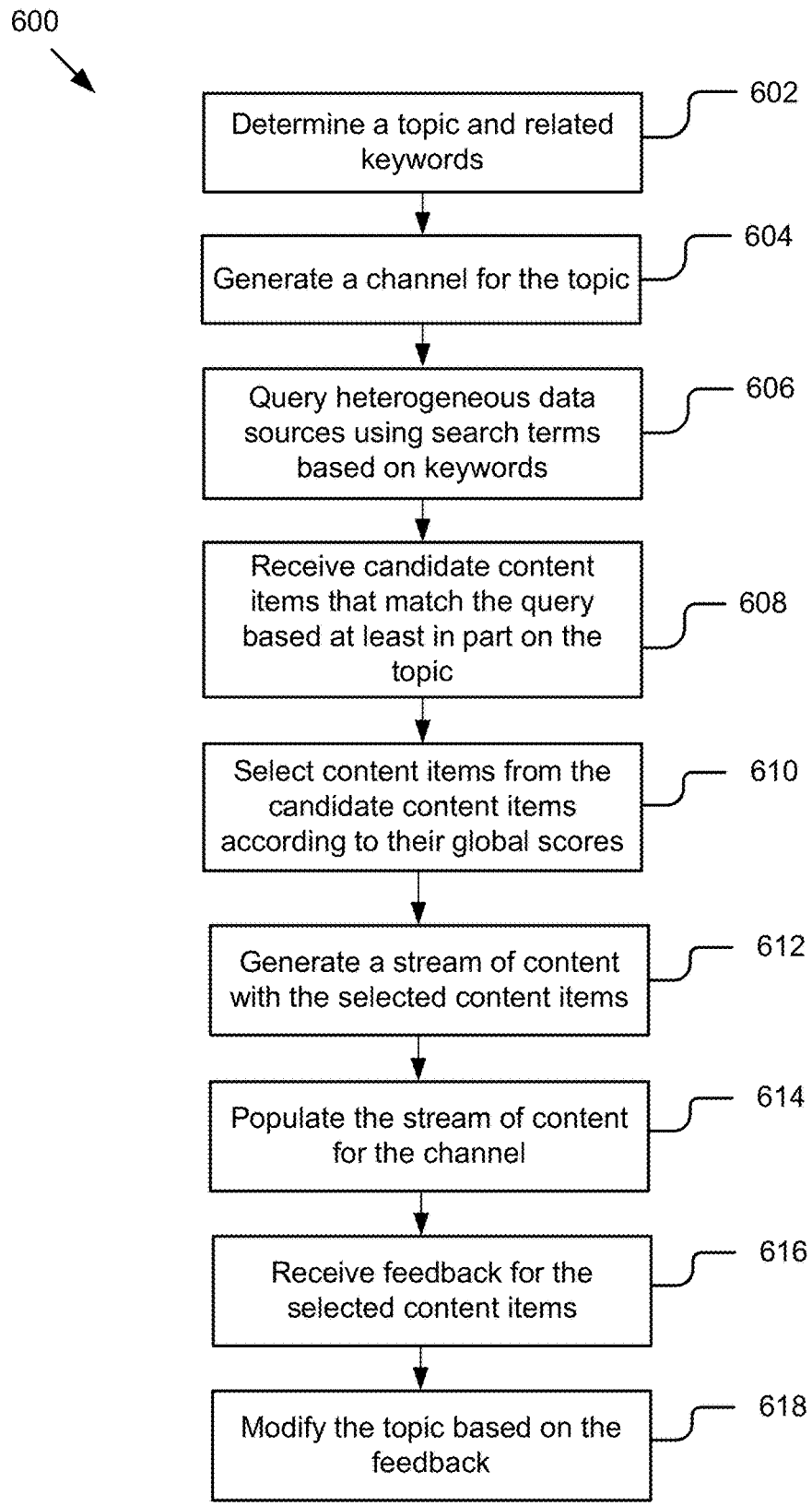
FIG. 6 is a flow diagram of an example of a method for generating a channel from data sources.

FIG. 6 is a flow diagram 600 of some implementations of a method for generating a channel for a topic. The channel engine 220 includes a channel generator 311, a content retriever 314, an authority analyzer 316, and a channel populator 318. The channel generator 311 determines 602 a topic and related keywords for a channel. In some implementations, the topic and the related keywords are determined based on the most popular content items from the heterogeneous data sources. In some implementations, the topic is requested by a third party or an individual and includes a brief description about the channel for this topic. The channel generator 311 generates 604 a channel for the topic.

The content retriever 314 queries 606 heterogeneous data sources using search terms based on the keywords. In some implementations the content retriever 314 queries the heterogeneous data sources directly and, in some implementations, the content retriever 314 queries a database that stores candidate content items from heterogeneous data sources. The content retriever 314 receives 608 candidate content items that match the query based at least in part on the topic. The candidate content items are retrieved from heterogeneous data sources that include, for example, news articles, tweets, blogs, videos, photos, posts made using the social network application 109, etc. The candidate content items contain the keywords and are related to the topic.

The channel populator 318 selects 610 content items from the candidate content items according to their global scores. In some implementations, the global score of all the selected content items have to exceed a certain threshold. As a result, less popular content is not displayed in situations where there is not enough space to display a complete content stream. The channel populator 318 generates 612 a stream of content for the channel with the selected content items. The channel populator 318 populates 614 the stream of content for the channel and the user interface engine 230 generates a user interface that includes the stream of content.

The channel generator 311 receives 616 feedback for the selected content items. For example, a user approves or disapproves of at least one of the selected content items. The channel generator 311 modifies 618 the topic based on the feedback. For example, if users disapprove of content items associated with the broad topic biking, the channel generator 311 modifies the topic to the more narrow mountain biking topic. This modification is further enforced if the channel generator 311 receives approval of more narrow topics.

Figure 7:
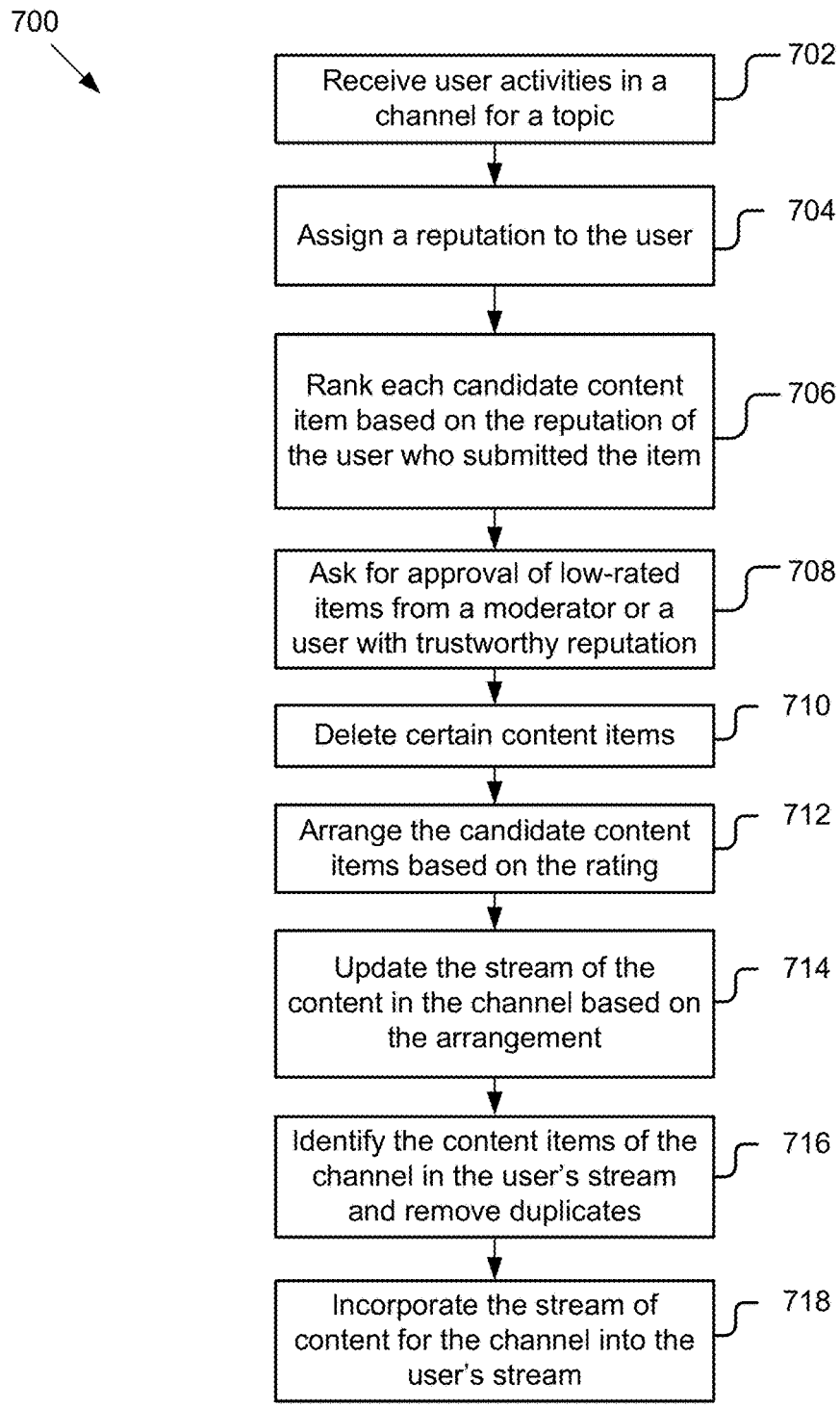
FIG. 7 is a flow diagram of an example of a method for updating a channel.

FIG. 7 is a flow diagram 700 of a method for updating a channel. The channel engine 220 receives 702 user activities in a channel for a topic. The activities include, for example, a blog post, a microblog post, a text-based post, a news feed, a video upload, a picture upload, a message post, and a new article post. The channel engine 220 assigns 704 a reputation to the user of the channel based on rules that include, for example, a number of other users that read the selected content items submitted by the user, a number of comments submitted by other users, and a number of indications of approval of the content items submitted by the user. The reputation is a score.

The channel engine 220 ranks 706 each candidate content item based on the reputation of the user who submits the item and according to such rules as the originality and the popularity of the item in the channel. For example, the channel engine 220 ranks a content item high because it is submitted by a user with a trustworthy reputation. In some examples, the channel engine 220 assigns an item a high ranking when the item is original and the item is popular in the channel (e.g., receiving a large number of readers, comments and approvals). In some implementations, the channel engine 220 asks 708 for approval of low-rated items for publication in the channel from a moderator or a user with a trustworthy reputation.

The channel engine 220 deletes 710 certain content items. In some implementations, the obsolete candidate content items are deleted. In some implementations, the candidate content items older than a period of time, for example, a month, are deleted.

The channel engine 220 arranges 712 the candidate content items based on the rating and updates 714 the stream of content for the channel based on the arrangement. The channel engine 220 identifies 716 the content items in the channel and also in the stream of content for a user and removes the duplicates. The channel engine 220 incorporates 718 the stream of content for the channel into the user's stream of the content.

Figure 8:
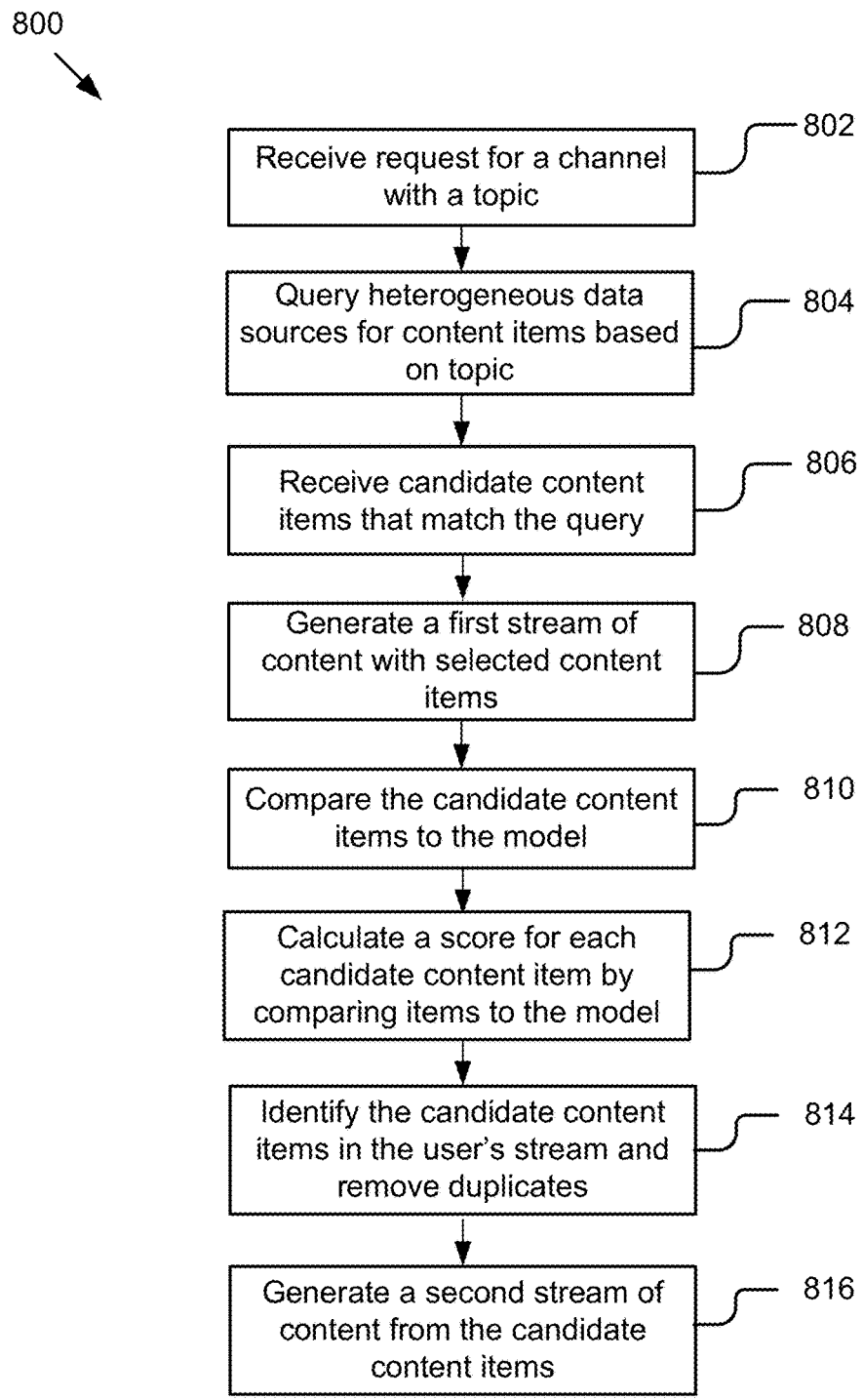
FIG. 8 is a flow diagram of an example of a method for personalizing a channel for a user.

FIG. 8 is a flow diagram 800 of a method for personalizing a channel for a user. The channel engine 220 receives a request for a channel with a topic. The channel engine 220 queries 804 heterogeneous data sources for content items based on the topic. The channel engine 220 receives 806 candidate content items that match the query and generates 808 a first stream of content with selected content items.

The channel engine 220 transmits the first stream of content to the scoring engine 211, which compares 810 the candidate content items to the model and calculates 812 a score for each candidate content items by comparing items to the model. The model is particular to a user. In some implementations, the scoring engine 211 identifies 814 the candidate content items in the stream of content for the user and removes items that are duplicates of items already in the user's stream of content. The scoring engine 211 generates 816 a second stream of content from the candidate content items. This results in a personalized channel for a user such that, for example, if the topic is about food and the user prefers the articles related to sushi, the scoring engine 211 removes the more general articles. In some implementations, other users can subscribe to the personalized stream of content for the channel. This can be very advantageous, for example, if the user is famous and other users want to see what the famous user reads in the area of technology.

In the above description, for purposes of explanation, numerous specific details are set forth in order to provide a thorough understanding of the specification. The specification can also be practiced without these specific details. In other instances, structures and devices are shown in block diagram form in order to avoid obscuring the description. For example, the specification is described in some implementations with reference to user interfaces and particular hardware. However, the description applies to any type of computing device that can receive data and commands, and any peripheral devices providing services.

Some portions of the detailed descriptions that follow are presented in terms of algorithms and symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms for example, "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments described in the specification also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The embodiments described in the specification can take the form of an entirely hardware embodiment, an entirely software embodiment, or an embodiment containing both hardware and software elements. In a preferred embodiment, the techniques described in the specification are implemented in software, which includes but is not limited to firmware, resident software, microcode, etc.

Furthermore, the embodiments in the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the teachings of the specification are not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the teachings of the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the teachings of the specification or its features may have different names, divisions and/or formats. Furthermore, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the teachings of the specification, which is set forth in the following claims.

What is claimed is:

1. A computer-implemented method comprising:
generating, with one or more processors, a channel for distributing content for a topic in a social network;
retrieving, with the one or more processors, candidate content items from data sources based on the topic;
determining, with the one or more processors, a reputation of a particular user who has previously interacted with the candidate content items, the reputation being based on an originality of the candidate content items, the originality of the candidate content items being based on whether a user submitted the candidate content items or transferred the candidate content items from another data source;
selecting, with the one or more processors, content items from the candidate content items based on a first item weight applied to the candidate content items and the reputation of the particular user who has previously interacted with the candidate content items;
generating, with the one or more processors, a stream of content with the selected content items;
populating, with the one or more processors, the stream of content for the channel and providing the stream of content to users associated with the channel;
receiving, with the one or more processors, feedback for the selected content items; and
modifying, with the one or more processors, the topic based on the feedback.

2. The computer-implemented method of claim 1, wherein the first item weight applied to the candidate content items is based on a relevance of the candidate content items with respect to a channel topic.

3. The computer-implemented method of claim 1, wherein the reputation of the particular user is based on a second item weight applied to a user-submitted content item submitted by the particular user.

4. The computer-implemented method of claim 1, further comprising:
  determining whether a user-submitted content item was originally submitted by the particular user; and
  modifying the reputation of the particular user responsive to determining that the user-submitted content item was originally submitted by the particular user.

5. The computer-implemented method of claim 1, wherein the reputation of the particular user is based on a number of the users associated with the channel and a number of interactions in the channel.

6. The computer-implemented method of claim 1, further comprising:
  ranking the candidate content items based on the reputation of the particular user; and
  arranging the selected content items in the stream of content according to the ranking.

7. The computer-implemented method of claim 1, further comprising:
  determining whether the reputation of the particular user satisfies a threshold;
  determining whether a second reputation of a moderator satisfies the threshold; and
  in response to the reputation of the particular user not satisfying the threshold and the second reputation of the moderator satisfying the threshold, requesting approval by the moderator before selecting a user-submitted content item submitted by the particular user.

8. The computer-implemented method of claim 1, wherein the reputation of the particular user is based on reactions by the users associated with the channel to user-submitted content items submitted by the particular user.

9. The computer-implemented method of claim 1, wherein the first item weight applied to the candidate content items is based on a relationship between the particular user and a second user requesting the stream of content, wherein a second item weight is applied to the candidate content items if the particular user is a direct friend of the second user and a third item weight is applied to the candidate content items if the particular user is a second-generation friend of the second user.

10. A system comprising:
  a processor; and
  a memory storing instructions that, when executed by the processor, cause the system to:
    generate a channel for distributing content for a topic in a social network;
    retrieve candidate content items from data sources based on the topic;
    determine a reputation of a particular user who has previously interacted with the candidate content items, the reputation being based on an originality of the candidate content items, the originality of the candidate content items being based on whether a user submitted the candidate content items or transferred the candidate content items from another data source;
    select content items from the candidate content items based on a first item weight applied to the candidate content items and the reputation of the particular user who has previously interacted with the candidate content items;
    generate a stream of content with the selected content items;
    populate the stream of content for the channel and providing the stream of content to users associated with the channel;
    receive feedback for the selected content items; and
    modify the topic based on the feedback.

11. The system of claim 10, wherein the first item weight applied to the candidate content items is based on a relevance of the candidate content items with respect to a channel topic.

12. The system of claim 10, wherein the reputation of the particular user is based on a second item weight applied to a user-submitted content item submitted by the particular user.

13. The system of claim 10, wherein the instructions, when executed by the processor, also cause the system to:
  determine whether a user-submitted content item was originally submitted by the particular user; and
  modify the reputation of the particular user responsive to determining that the user-submitted content item was originally submitted by the particular user.

14. The system of claim 10, wherein the reputation of the particular user is based on a number of the users associated with the channel and a number of interactions in the channel.

15. The system of claim 10, wherein the instructions, when executed by the processor, also cause the system to:
  rank the candidate content items based on the reputation of the particular user; and
  arrange the selected content items in the stream of content according to the rank.

16. The system of claim 10, wherein the instructions, when executed by the processor, cause the system to:
  determine whether the reputation of the particular user satisfies a threshold;
  determine whether a second reputation of a moderator satisfies the threshold; and
  in response to the reputation of the particular user not satisfying the threshold and the second reputation of the moderator satisfying the threshold, request approval by the moderator before selecting a user-submitted content item submitted by the particular user.

17. The system of claim 10, wherein the reputation of the particular user is based on reactions by the users associated with the channel to user-submitted content items submitted by the particular user.

18. The system of claim 10, wherein the first item weight applied to the candidate content items is based on a relationship between the particular user and a second user requesting the stream of content, wherein a second item weight is applied to the candidate content items if the particular user is a direct friend of the second user and a third item weight is applied to the candidate content items if the particular user is a second-generation friend of the second user.

19. A computer program product comprising a non-transitory computer usable medium including a computer readable program, wherein the computer readable program, when executed on a computer, causes the computer to:
  generate a channel for distributing content for a topic in a social network;
  retrieve candidate content items from data sources based on the topic;

determine a reputation of a particular user who has previously interacted with the candidate content items, the reputation being based on an originality of the candidate content items, the originality of the candidate content items being based on whether a user submitted the candidate content items or transferred the candidate content items from another data source;

select content items from the candidate content items based on a first item weight applied to the candidate content items and the reputation of the particular user who has previously interacted with the candidate content items;

generate a stream of content with the selected content items;

populate the stream of content for the channel and providing the stream of content to users associated with the channel;

receive feedback for the selected content items; and modify the topic based on the feedback.

20. The computer program product of claim 19, wherein the first item weight applied to the candidate content items is based on a relevance of the candidate content items with respect to a channel topic.

21. The computer program product of claim 19, wherein the reputation of the particular user is based on a second item weight applied to a user-submitted content item submitted by the particular user.

22. The computer program product of claim 19, wherein the computer readable program, when executed on the computer, also causes the computer to:

determine whether a user-submitted content item was originally submitted by the particular user; and modify the reputation of the particular user responsive to determining that the user-submitted content item was originally submitted by the particular user.

23. The computer program product of claim 19, wherein the reputation of the particular user is based on a number of the users associated with the channel and a number of interactions in the channel.

24. The computer program product of claim 19, wherein the computer readable program, when executed on the computer, also causes the computer to:

rank the candidate content items based on the reputation of the particular user; and arrange the selected content items in the stream of content according to the rank.

25. The computer program product of claim 19, wherein the computer readable program, when executed on the computer, causes the computer to:

determine whether the reputation of the particular user satisfies a threshold;

determine whether a second reputation of a moderator satisfies the threshold; and in response to the reputation of the particular user not satisfying the threshold and the second reputation of the moderator satisfying the threshold, request approval by the moderator before selecting a user-submitted content item submitted by the particular user.

26. The computer program product of claim 19, wherein the reputation of the particular user is based on reactions by the users associated with the channel to user-submitted content items submitted by the particular user.

27. The computer program product of claim 19, wherein the first item weight applied to the candidate content items is based on a relationship between the particular user and a second user requesting the stream of content, wherein a second item weight is applied to the candidate content items if the particular user is a direct friend of the second user and a third item weight is applied to the candidate content items if the particular user is a second-generation friend of the second user.

* * * * *